US009645952B2

(12) United States Patent
Ma

(10) Patent No.: US 9,645,952 B2
(45) Date of Patent: May 9, 2017

(54) USB DEVICE COMMUNICATION SYSTEM AND WORKING MODE SWITCHING METHOD TO PREVENT USB DEVICE FROM ADOPTING POWER INTERRUPTION WHEN RECONFIGURING FIRMWARE PROGRAMS

(71) Applicant: ZTE Corporation, Shenzhen, Guangdong (CN)

(72) Inventor: Weiwei Ma, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 73 days.

(21) Appl. No.: 14/443,707

(22) PCT Filed: Jul. 24, 2013

(86) PCT No.: PCT/CN2013/080044
§ 371 (c)(1),
(2) Date: May 19, 2015

(87) PCT Pub. No.: WO2013/167077
PCT Pub. Date: Nov. 14, 2013

(65) Prior Publication Data
US 2015/0293861 A1    Oct. 15, 2015

(30) Foreign Application Priority Data

Nov. 20, 2012  (CN) .......................... 2012 1 0472197

(51) Int. Cl.
*G06F 13/00*    (2006.01)
*G06F 13/10*    (2006.01)
(Continued)

(52) U.S. Cl.
CPC ............ *G06F 13/102* (2013.01); *G06F 13/20* (2013.01); *G06F 13/382* (2013.01);
(Continued)

(58) Field of Classification Search
CPC ....... G06F 13/102; G06F 13/382; G06F 13/20
(Continued)

(56) References Cited

U.S. PATENT DOCUMENTS 8,156,271 B2 *  4/2012  Reece ..................... G06F 3/061
                                                                                710/74
8,161,213 B2    4/2012  Kadota
(Continued)

FOREIGN PATENT DOCUMENTS

CN    101452435 A    6/2009
CN    101477498 A    7/2009
(Continued)

OTHER PUBLICATIONS

International Search Report in international application No. PCT/CN2013/080044, mailed on Oct. 10, 2013.
(Continued)

*Primary Examiner* — Tammara Peyton
(74) *Attorney, Agent, or Firm* — Oppedahl Patent Law Firm LLC

(57) ABSTRACT

Provided are a USB device, a communication system and a method thereof for work mode switching, where the method for work mode switching of the USB device includes: a USB device is inserted into a host, wherein the USB device is configured with single disk device information and at least one type of work mode information; the single disk device information is sent to the host by the USB device, wherein the single disk device information includes installation information as per which the host installs a function management module; and a work mode is selected by the USB device according to a configuration instruction issued by the function management module of the host and configured as a current valid work mode. According to the present disclosure, the USB device, the communication system and the
(Continued)

method thereof for work mode switching are capable of accomplishing work mode switching without reconfiguration of firmware programs requiring interruption of power supply, thereby reducing switching time of work modes.

13 Claims, 5 Drawing Sheets

(51) Int. Cl.
 *G06F 13/38* (2006.01)
 *G06F 13/20* (2006.01)
(52) U.S. Cl.
 CPC ... *G06F 2213/0042* (2013.01); *Y02B 60/1228* (2013.01); *Y02B 60/1235* (2013.01)
(58) Field of Classification Search
 USPC .......................................... 710/8–10, 14–16
 See application file for complete search history.

(56) References Cited

U.S. PATENT DOCUMENTS

| | | | | |
|---|---|---|---|---|
| 8,499,104 | B2* | 7/2013 | Nie ...................... | G06F 13/102 710/14 |
| 2003/0046447 | A1* | 3/2003 | Kouperchliak ....... | G06F 9/4415 719/321 |
| 2005/0204072 | A1 | 9/2005 | Nakagawa | |
| 2008/0244123 | A1 | 10/2008 | Kadota | |
| 2011/0231682 | A1* | 9/2011 | Kakish ................. | G06F 1/1632 713/320 |
| 2012/0179845 | A1 | 7/2012 | Nie | |
| 2013/0013818 | A1 | 1/2013 | Nie et al. | |
| 2013/0181660 | A1* | 7/2013 | Zhou .................... | H02J 7/0052 320/107 |
| 2015/0169484 | A1 | 6/2015 | Lu | |

FOREIGN PATENT DOCUMENTS

| | | |
|---|---|---|
| CN | 101477509 A | 7/2009 |
| CN | 102103555 A | 6/2011 |
| CN | 102981981 A | 3/2013 |
| EP | 2474913 A1 | 7/2012 |
| EP | 2860627 A1 | 4/2015 |
| JP | 2008250736 A | 10/2008 |
| WO | 03012577 A2 | 2/2003 |

OTHER PUBLICATIONS

English Translation of the Written Opinion of the International Search Authority in international application No. PCT/CN2013/080044, mailed on Oct. 10, 2013.

Supplementary European Search Report in European application No. 13787602.5, mailed on Sep. 29, 2015.

* cited by examiner

USB DEVICE COMMUNICATION SYSTEM AND WORKING MODE SWITCHING METHOD TO PREVENT USB DEVICE FROM ADOPTING POWER INTERRUPTION WHEN RECONFIGURING FIRMWARE PROGRAMS

TECHNICAL FIELD

The present disclosure relates to the field of communications, and in particular to a universal serial bus (USB) device, a communication system and a method thereof for work mode switch.

BACKGROUND

At present, numerous USB devices in the market have a switching process from a disk working mode to a multi-port working mode. If a host is not installed with a user interface (user interface, UI) program and a driver, then a USB device will report information of a single disk CDROM-class device after connecting to a computer, wherein the CDROM includes a UI program and a driver required for the USB device in the multi-port mode. After installation is completed, the UI or the driver will automatically detect the USB and send a specific instruction to make the USB device switch from the disk working mode to the multi-port working mode.

The current common solution has drawbacks in principle as follows:

(1) no matter whether or not the UI or the driver has been successfully installed in the host, a USB device is firstly enumerated as a CDROM-class device each time when the USB device is inserted into the host, wherein the UI or the driver of the CDROM detects if programs that are required for the device to work normally have been installed in the host. If no such programs have been installed, then the disk state is maintained and a user is reminded of installation. If such programs have been installed, then a switch instruction is sent, causing the device to switch to the multi-port working mode. The process of the working mode switching normally requires the USB device to reconfigure firmware programs by cutting off power supply. However, such a switching mode is time consuming, and the time cost is detrimental to improving user experience; and moreover, such switching mode brings about compatibility problems for the firmware programs and UI programs of the USB device.

SUMMARY

The major technical problem the present disclosure is intended to solve is to provide a USB device, a communication system and a method thereof for work mode switching, thus avoiding the USB device from cutting off the power supply when reconfiguring firmware programs for the purpose of switching a work mode.

To this end, the present disclosure is intended to provide a USB device, a communication system and a method thereof for work mode switching, and the technical solutions are implemented as follows.

A method for work mode switching of a USB device includes steps as follows:

inserting a USB device into a host, wherein the USB device is configured with single disk device information and information of at least one work mode;

sending, by the USB device, the single disk device information to the host, wherein the single disk device information comprises installation information as per which the host installs a function management module; and selecting, by the USB device, information of a work mode according to a configuration instruction issued by the function management module of the host, and configuring the work mode as a current valid work mode.

Preferably, the step of selecting, by the USB device, information of a work mode according to a configuration instruction issued by the function management module of the host, and configuring the work mode as a current valid work mode may include:

sending, by the USB device, work mode information to the host according to an information request instruction issued by the host; and receiving, by the USB device, the configuration instruction issued by the host based on the work mode information. selecting information of the work mode and configuring the work mode as the current valid work mode.

Preferably, selecting information of a work mode and configuring the work mode as the current valid work mode, the method may further include:

receiving, by the USB, an information report instruction issued by the host and reporting current work mode information to the host according to the information report instruction.

Preferably, after inserting the USB device into the host, the method may further include:

initializing an application layer module to place the application layer module in a ready state.

A method for work mode switch of a communication system includes following steps:

inserting a universal serial bus (USB) device into a host, wherein the USB device is configured with single disk device information and information of at least one work mode;

sending, by the USB device, the single disk device information to the host, wherein the single disk device information comprises installation information as per which the host installs a function management module;

installing, by the host, the function management module according to installation information in the single disk device information, and then generating and issuing, by the function management module, a configuration instruction to the USB device; and selecting, by the USB device, information of a work mode according to the configuration instruction issued by the function management module of the host, and configuring the work mode as a current valid work mode.

Preferably, the step of generating a configuration instruction by the function management module may include:

issuing, by the host, an information request instruction to the USB device;

sending, by the USB device, work mode information to the host; and generating, by the function management module, the configuration instruction according to the work mode information sent by the USB device.

Preferably, the step of generating a configuration instruction by the function management module may include:

receiving, by the function management module, instruction information input by a user and generating the configuration instruction according to the instruction information.

Preferably, selecting information of a work mode and configuring the work mode as the current valid work mode, the method may further include:

forcing, by the function management module, a refresh of a USB device management module of the host, to cause the USB device management module of the host to issue an information report instruction to the USB device; and reporting, by the USB device, current work mode information to the host according to the issued information request instruction.

Likewise, to solve the aforementioned technical problem, the present disclosure further provides a USB device and specific technical solutions are as follows:

a USB device includes a USB configuration module and an instruction receiving module;

wherein the USB configuration module is configured to, after the USB is inserted into a host, configure single disk device information and information of at least one work mode, and send the single disk device information to the host, wherein the single disk device information comprises installation information as per which the host installs a function management module;

the instruction receiving module is configured to receive a configuration instruction issued by the function management module of the host; and the USB configuration module is further configured to select information of a work mode according to the configuration instruction and configure the work mode as a current valid work mode.

Preferably, the USB configuration module may be configured to send work mode information to the host according to an information request instruction issued by the host, receive the configuration instruction issued by the host based on the work mode information and select information of the work mode and configuring the work mode as the current valid work mode.

Preferably, the USB configuration module may be further configured to receive an information report instruction issued by the host and report current work mode information to the host according to the information report instruction.

Preferably, the USB device may further include an application management module, configured to initialize an application layer module to place the application layer module in a ready state after the USB device is inserted into the host and the host is powered on.

Likewise, in order to solve the abovementioned technical problem, the present disclosure further provides a communication system, including a host and the USB device according to any one of the aforementioned, wherein the host is configured to install a function management module according to installation information in single disk device information, and the function management module is configured to generate and issue a configuration instruction to the USB device.

The beneficial effects of the present disclosure hereinafter are:

the present disclosure provides a USB device, a communication system and a method thereof for work mode switching, avoiding the USB device from cutting off the power supply when reconfiguring firmware programs for the purpose of switching a work mode. According to the method for work mode switching, the USB device is configured with single disk device information and information of at least one work mode, and it selects information of a work mode and configures the selected work load as a current valid work mode. It is known that the USB device is configured with a plurality of work modes. A USB work mode suitable for a host is selected based on a configuration instruction generated by the host so as to implement the work mode switching, without needing of interruption of power supply to reconfigure firmware programs, thereby reducing time spent on function switching of the USB device, and further solving the compatibility problems for the firmware programs and UI programs of the device.

DETAILED DESCRIPTION

Detailed description of embodiments in combination of drawings is provided hereinafter.

Embodiment One

Figure 1:
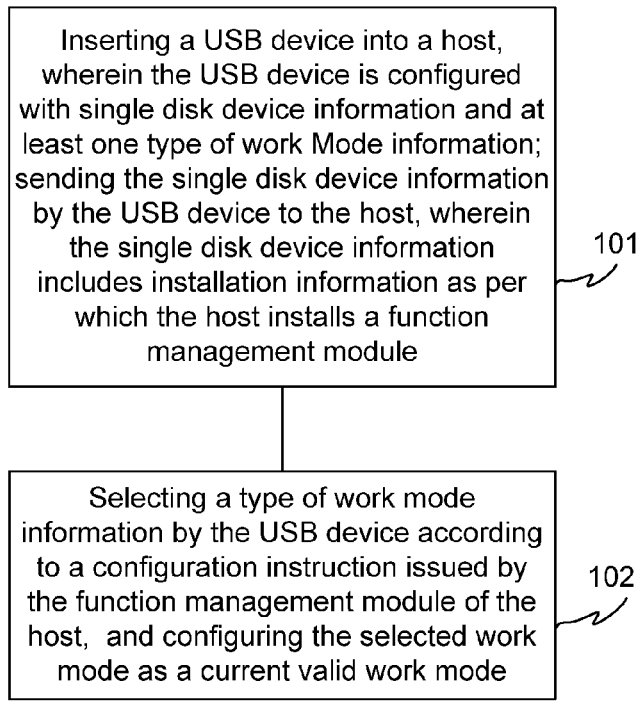
FIG. 1 is a flowchart of a method for work mode switching of a USB device according to embodiment I of the present disclosure.

As shown in FIG. 1, a method for work mode switching of a USB device according to the embodiment includes:

Step 101: a USB device is inserted into a host, wherein the USB device is configured with single disk device information and information of at least one work mode;

the single disk device information is sent to the host by the USB device, wherein the single disk device information includes installation information as per which the host installs a function management module; and Step 102: the USB device selects information of a work mode according to a configuration instruction issued by the function management module of the host and configures the work mode as a current valid work mode.

According to USB protocols, a plurality of configuration descriptors simultaneously exist in a device, however, only one set of configuration is valid at a moment. After the USB device is inserted into the host, the operating system issues an information request (GET_DESCRIPTOR) instruction to request a device descriptor, a configuration descriptor), an interface descriptor and an endpoint descriptor. The device descriptor is for indicating the number of configurations supported by the device at the moment. Each work mode of the USB device corresponds to a set of configurations. The single disk device information and a plurality of types of work mode information are generated under two conditions as follows: a first condition is that, when leaving the factory, the USB device has been configured with a plurality of types of work mode information and single disk device information, under which the configured work modes may be several universal work modes (for example, a single CDROM mode configured to install a UI, a multi-port mode, a work mode with a AT/MODEM (modulator-demodulator) function and with capability of providing internet service for users, and a MBIM internet mode for the Windows 8 system only, etc); and a second condition is that, after the USB device is inserted into the host and the host is powered on, the USB device is configured with a plurality of types of work mode information and single disk device information. The configuration mode may be that several proper work modes are configured in view of the condition of the host, after the USB device is inserted into the host. Configuring the work mode information of the USB device in accordance with the embodiment may be that the USB assigns 15 pairs of USB endpoints (endpoint) into a plurality of groups, where each group of the endpoints is bound with a processing mechanism with specific functions and forms into a configuration, i.e., a piece of work mode information, and each configuration corresponds to a function mode and implements a specific function.

After the USB device is inserted into the host, the USB generates the single disk device information and a plurality of USB work mode information. First, the USB reports the single disk device information, where the single disk device information includes installation information as per which the host installs a function management module. The host installs the function management module according to the installation information, and then the function management module of the host generates and issues a configuration instruction to the USB device. The USB device receives the configuration instruction, selects a type of work mode information from the plurality of types of USB work mode information, and configures the selected work mode as a current valid work mode, thereby completing the work mode switching.

According to the above step 102, the step of the USB device selecting a type of work mode information according to a configuration instruction issued by the function management module of the host and configuring the selected work mode as a current valid work mode includes that:

the USB device sends corresponding work mode information to the host according to an information request instruction issued by the host; and the USB device receives the configuration instruction issued by the host based on the work mode information, selects a type of work mode information and configures the selected word mode as the current valid work mode.

Figure 2:
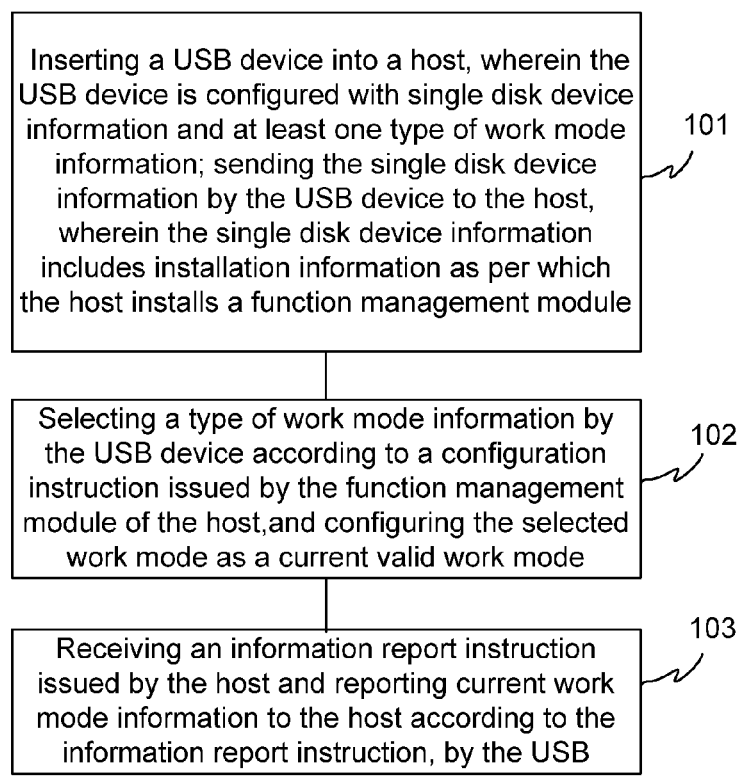
FIG. 2 is another flowchart of a method for work mode switching of a USB device according to embodiment I of the present disclosure.

As shown in FIG. 2, the method for the work mode switching of the USB device according to the embodiment further includes step 103 which includes that the USB receives an information report instruction issued by the host and reports current work mode information to the host according to the information report instruction. After the work mode switching of the USB device is finished, the USB reports the current work mode information to the host and informs the host of the completion of the switching on the USB device side. Then communication is carried out between the host and the USB device.

According to step 101 of the method for the work mode switching of the USB device, after the USB device is inserted into the host, the method further includes that an application layer module is initialized to be placed in a ready state.

The method for the work mode switching of the USB device according to the embodiment employs a feature of the USB, that is, the USB has a plurality of configurations without need of switching, to implement function switching of the USB device by employing the host to refresh the USB device management module, thus reducing switching time needed in a traditional scheme, improving user experience, and adequately embodying the efficiency and convenience of the USB device.

Figure 3:
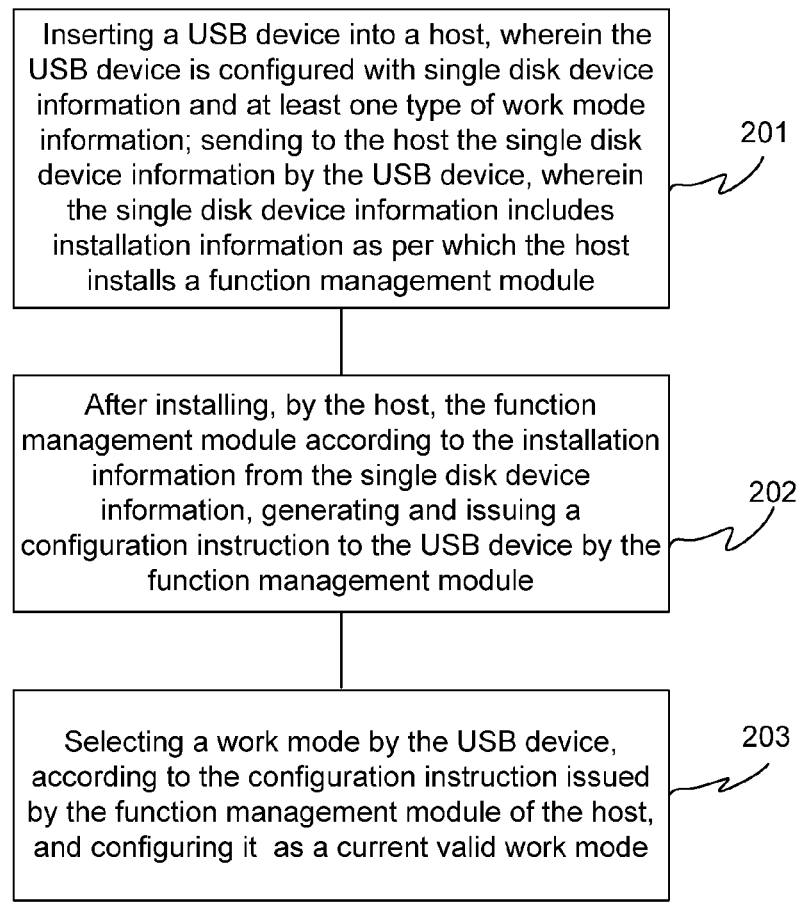
FIG. 3 is a flowchart of a method for work mode switching of a communication system according to embodiment I of the present disclosure.

As shown in FIG. 3, the embodiment further provides a method for work mode switching of a communication system, which includes that:

Step 201: a USB device is inserted into a host, wherein the USB device is configured with single disk device information and at least one type of work mode information;

the USB device sends the single disk device information to the host, wherein the single disk device information includes installation information as per which the host installs a function management module;

Step 202: after the host installs the function management module according to the installation information in the single disk device information, the function management module generates and issues a configuration instruction to the USB device; and Step 203: the USB device selects a type of work mode information according to the configuration instruction issued by the function management module of the host, and configures the selected work mode as a current valid work mode.

According to the method for work mode switching of the embodiment, the USB device generates a plurality of types of work mode information. In addition, a suitable work mode is selected by the host, therefore, reconfiguration by the USB itself is not required. What is required is to set USB work mode information generated in advance as the current work mode information, thereby reducing time for switching the USB work mode.

According to step 203, a process of the function management module generating the configuration instruction further includes that:

an information request instruction is issued by the host to the USB device;

corresponding work mode information is sent by the USB device to the host; and the configuration instruction is generated by the function management module according to the work mode information sent by the USB device.

According to step 203, a process of the function management module generating the configuration instruction further includes that:

the function management module receives instruction information input by a user and generates the configuration instruction according to the instruction information.

Therefore, there are the above two modes for the function management module to generate the configuration instruction. One is to select a work mode suitable for the host by comparing the work mode information reported by the USB device and the configuration of the host. For example, the USB device descriptor is for indicating the number of configurations supported by the device, and the host issues GET_DESCRIPTOR instructions for many times according to the number. The device reports all supported work mode information, and then selects the most suitable work mode information it considers by a configuration instruction, SET_CONFIGURATION. Of course, the host may send a GET_DESCRIPTOR instruction once, and the USB device reports a type of work mode information. The host compares the work mode information and its own configuration in order to decide whether the work mode information is suitable; if it is suitable, the host issues a SET_CONFIGURATION instruction to the USB device; if it is not suitable, the host continues sending SET_CONFIGURATION, requesting the work mode information of the USB device until a work mode is suitable.

The method for the work mode switching of the communication system further includes:

the function management module forces a refresh of a USB device management module of the host, to cause the USB device management module of the host to issue an information report instruction to the USB device; and the USB device reports current work mode information to the host according to the issued information request instruction.

According to the embodiment, the single disk device information of the USB device further includes a UI program or a driver, causing the host to drive the USB device and to realize data communications; if initially the function management module detects that no UI program or the driver is installed in the host, the function management module acquires the UI program or the driver in the single disk device information to install a driver and a human-computer interaction interface. If the function management module detects that a UI program or a driver has been installed in the host, the function management module selects a suitable work mode according to the configuration of the host, and issues a corresponding configuration instruction to the USB device.

According to the embodiment of the method for work mode switching of a communication system, a plurality of work modes is configured by the USB device, and then the host selects a suitable work mode according to the configuration situation, and the USB device selects a work mode as a current valid work mode from the plurality of work modes, in order to complete the work mode switching of the USB device. The traditional mode, i.e., interruption of power supply, is not required to reconfigure firmware programs for realization of work mode switching, reducing switching time of the work mode and rendering fast and efficient work mode switching. In addition, the method solves the compatibility problem of the fixed programs.

Embodiment Two

Figure 4:
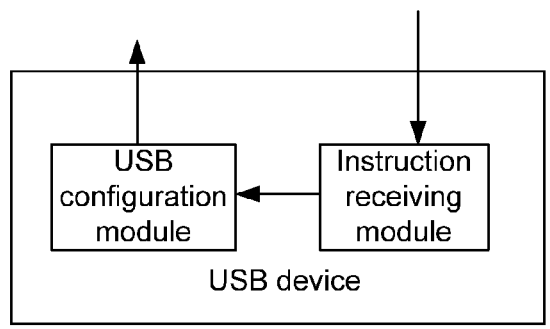
FIG. 4 is a structural diagram of a USB device according to embodiment II of the present disclosure.

The embodiment provides a USB device in conformity with the method for work mode switching of the USB device according to embodiment one. As shown in FIG. 4, the USB device, according to the embodiment, includes a USB configuration module and an instruction receiving module;

the USB configuration module is configured to, after the USB is inserted into a host, configure single disk device information and at least one type of work mode information, and send the single disk device information to the host;

the single disk device information includes installation information as per which the host installs a function management module;

the instruction receiving module is configured to receive a configuration instruction issued by the function management module of the host; and the USB configuration module is further configured to select a type of work mode information and configures the selected work mode as a current valid work mode according to the configuration instruction.

The USB configuration module is configured to send corresponding work mode information to the host according to an information request instruction issued by the host, receive the configuration instruction issued by the host based on the work mode information, select a type of work mode information and configure the selected work mode as the current valid work mode. The USB configuration module receives the information request instruction sent by the host, such as a GET_DESCRIPTOR instruction, and reports to the host a plurality of types of configured work mode information. The host selects a work mode according to the reported work mode information and in conjunction with its own configuration, generates a configuration instruction and issues the configuration instruction to the instruction receiving module of the USB device; the configuration module of the USB device selects a type of work mode information according to the configuration instruction and configures the selected work mode as a current valid work mode.

According to the embodiment, the USB configuration module of the USB device is further configured to receive an information report instruction issued by the host and report current work mode information to the host according to the information report instruction.

Figure 5:
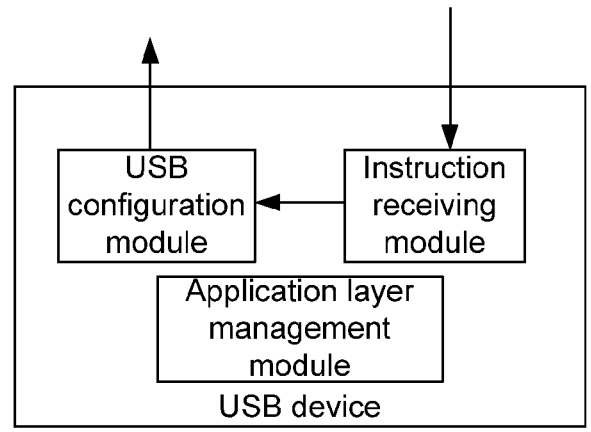
FIG. 5 is another structural diagram of a USB device according to embodiment II of the present disclosure.

As shown in FIG. 5, the USB device, according to the embodiment, further includes an application management module which is configured to initialize an application layer module to place the application layer module in a ready state after the USB device is inserted into the host and the host is powered on.

According to the embodiment, the USB configuration module is responsible for generation of USB descriptors, for formation of all types of work mode information, and for determining function types of the device embodied on the host side.

After the device is inserted into the host, the USB configures a report module to form a plurality of types of work modes, and firstly reports single disk CDROM device information to enable the user to install a host-side management module thereof. After the management module is successfully installed, the USB detects the configuration of the host and issues an indication instruction including configuration information. Upon receipt of the indication instruction from the management module, the instruction receiving module notifies the USB configuration module to configure corresponding work mode as the current work mode. Subsequently, the function management module forces a refresh of the USB device management module of the host, which causes the USB device management module of the host to re-issue a GET_DESCRIPTOR instruction. The USB configuration module reports information of current valid work mode.

Figure 6:
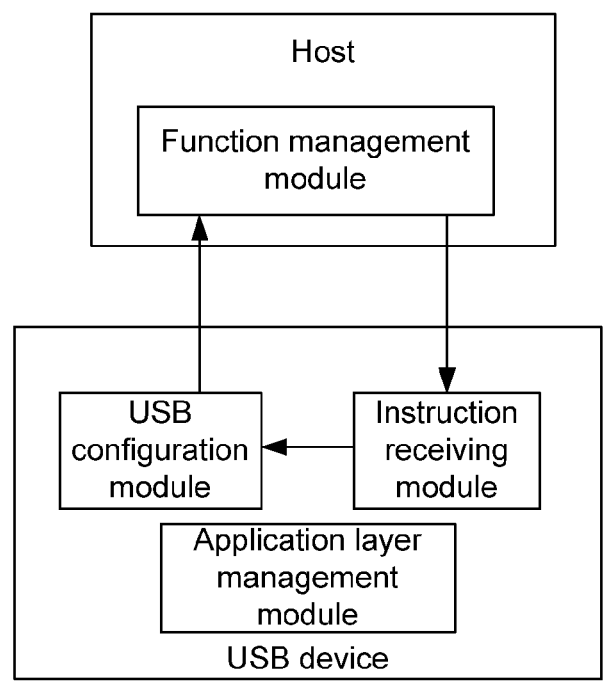
FIG. 6 is a structural diagram of a communication system according to embodiment II of the present disclosure.

As shown in FIG. 6, corresponding to the work mode switching of the communication system in embodiment one, the embodiment further provides a host and the USB device, where the host is configured to install a function management module according to installation information in single disk device information and the function management module is configured to generate and issue a configuration instruction to the USB device.

According to the embodiment, the host is a computer, and the USB device is a wireless card, a wireless data card, etc.

Embodiment Three

Figure 7:
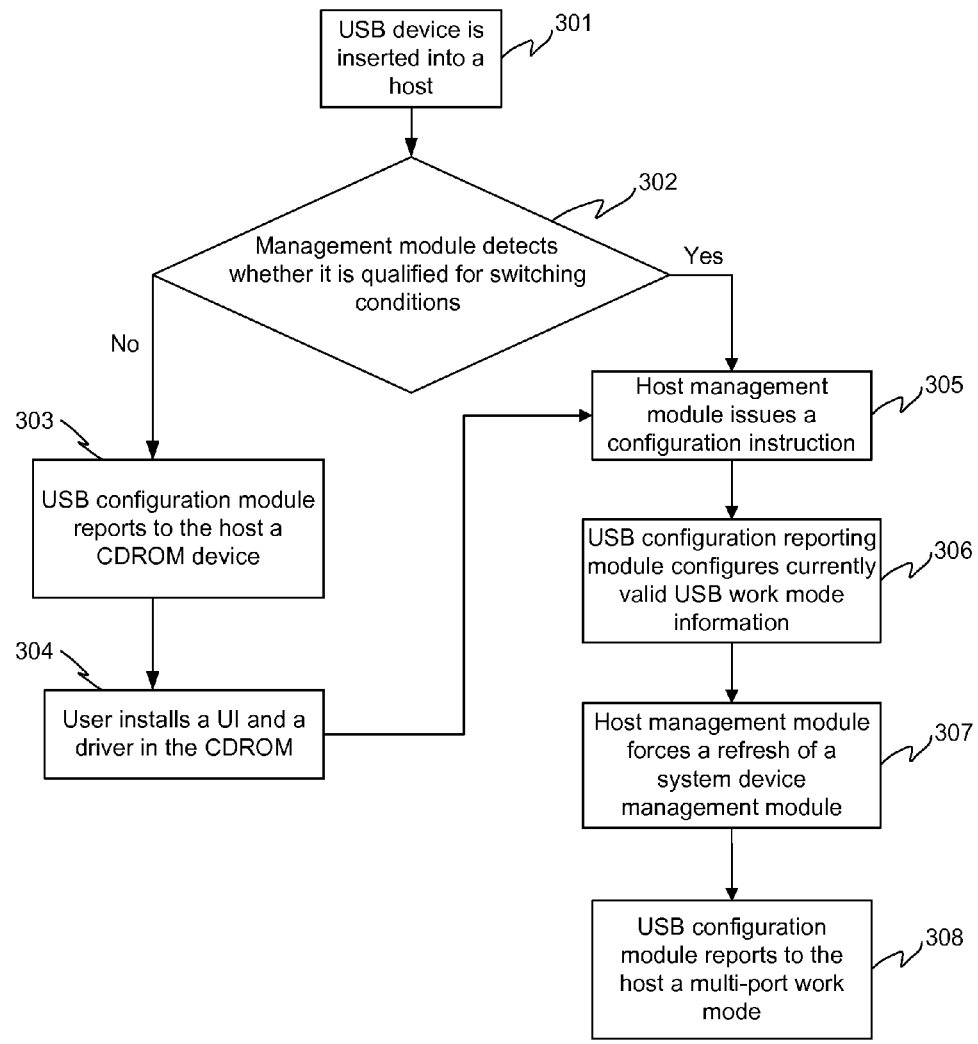
FIG. 7 is a flowchart of a method for work mode switch of a USB device according to embodiment III of the present disclosure.

The embodiment applies the method, the device and the system of embodiment one to realize switching of function of a USB device. According to the embodiment, the USB device and a host are connected, employing features of the USB with a plurality of configurations to realize the switching of the function of the device. After the USB device is connected to the host, the USB device firstly reports a single CDROM state, where the function management software of the host decides whether or not to issue an indication instruction and to force the system to refresh the device management module. In particular, as shown in FIG. 7, the USB device switching the USB device from a single disk mode to a multi-port mode is taken as an example:

Step 301: after the device is inserted into the host, a USB configuration module generates a plurality of types of work mode information and firstly reports the single disk CDROM device information. The application management module initializes and places all necessary application layer modules in a ready state, where the single disk device information includes installation information as per which the host installs a function management module;

Step 302: the host installs the function management module; the function management module detects whether the UI and the driver at the host side have been installed and whether the switching conditions are ready; if the conditions for switching are ready, step 305 is then executed, else, step 303 is executed;

Step 303: the USB configuration module reports the single disk CDROM device information to the host;

Step 304: the user is prompted to install the UI and the driver in the CDROM, and step 305 is executed after installation is completed;

Step 305: the function management module issues an instruction according to a preset judgement;

Step 306: an instruction receiving module at the USB device side informs the USB configuration management module to set the current valid work mode as a multi-port work mode according to the instruction;

Step 307: the function management module forces the system to refresh its device management module and to issue a GET_DESCRIPTOR instruction; and Step 308: the device reports the multi-port work mode; if the USB device is under a normal working state, the user may use the USB device directly.

With the function management module at the host side, the switching time problem in conventional function switching of the USB device is solved, which realizes selection and control of the USB function types and compensates for the deficiency of the multiple configuration scheme which is incapable of in autonomously choosing function modes in an operating system in the USB standard solution, thus enhancing user experience.

Furthermore, not only can an embodiment of the present disclosure be employed to reduce the switching time spent on program installation and function switch, it also can be adapted to any problems akin to function switching of the USB device.

Figure 8:
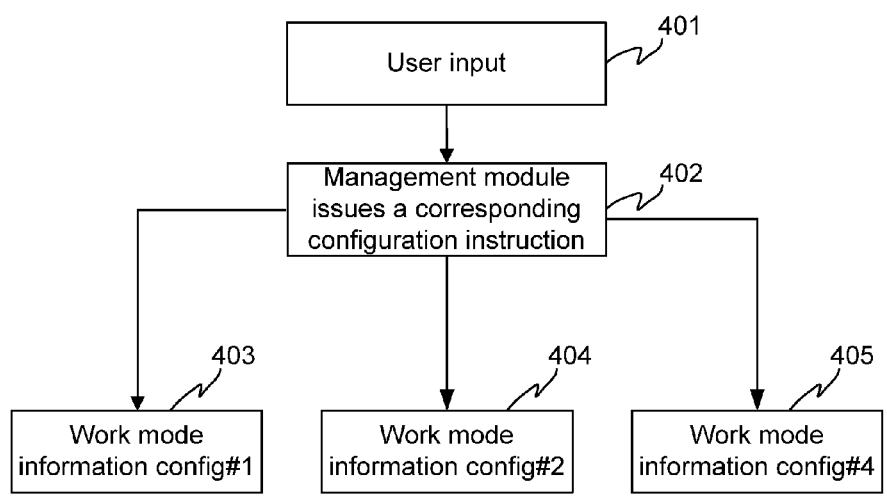
FIG. 8 is another flowchart of a method for work mode switching of a USB device according to embodiment III of the present disclosure.

FIG. 8 shows a flowchart of a function switching method of a USB device, of which detailed description is as follows:

Step 401: a user inputs an instruction when using the USB device, informing the function management module of function parameter information in use;

Step 402: the function management module is notified to decide work mode information reported by the USB configuration module, and to issue an instruction according to work mode information;

Step 403, 404, and 405: the configuration module reports corresponding work mode information to realize work mode switching of the USB device.

According to the embodiments of the present disclosure, the implementing methods for any USB function switching are described, which can reduce the switching time in contrast to conventional solutions, and have a more flexible switching process.

The aforementioned is detailed description in combination with specific embodiments for the present disclosure. The embodiments of the present disclosure should not be appreciated as merely limited to the above description. To those skilled in the art, without departing from the spirit and scope of the disclosure, any simple inferences or replacements shall be regarded as falling within the protection scope of the present disclosure.

What is claimed is:

1. A method for work mode switching of a universal serial bus (USB) device, comprising:
   inserting a USB device into a host, wherein the USB device is configured with single disk device information and information of at least one work mode;
   sending, by the USB device, the single disk device information to the host, wherein the single disk device information comprises installation information as per which the host installs a function management module;
   installing, by the host, the function management module according to installation information in the single disk device information, and then generating and issuing, by the function management module, a configuration instruction to the USB device; and
   selecting, by the USB device, information of a work mode according to a configuration instruction issued by the function management module of the host, and configuring the work mode as a current valid work mode;
   wherein the generating a configuration instruction by the function management module comprises:
   issuing, by the host, an information request instruction to the USB device;
   sending, by the USB device, work mode information to the host; and
   generating, by the function management module, the configuration instruction according to the work mode information sent by the USB device.

2. The method for work mode switching of a USB device according to claim 1, wherein the selecting, by the USB device, information of a work mode according to a configuration instruction issued by the function management module of the host, and configuring the work mode as a current valid work mode comprises:
   sending, by the USB device, work mode information to the host according to an information request instruction issued by the host; and
   receiving, by the USB device, the configuration instruction issued by the host based on the work mode information, selecting information of the work mode and configuring the work mode as the current valid work mode.

3. The method for work mode switching of a USB device according to claim 1, after selecting information of a work mode and configuring the work mode as the current valid work mode, the method further comprising:
   receiving, by the USB, an information report instruction issued by the host and reporting current work mode information to the host according to the information report instruction.

4. The method for work mode switching of a USB device according to claim 3, after inserting the USB device into the host, the method further comprising:
   initializing an application layer module to place the application layer module in a ready state.

5. The method for work mode switching of a communication system according to claim 1, after selecting information of a work mode and configuring the work mode as the current valid work mode, the method further comprising:
   forcing, by the function management module, a refresh of a USB device management module of the host, to cause the USB device management module of the host to issue an information report instruction to the USB device; and reporting, by the USB device, current work mode information to the host according to the issued information request instruction.

6. A communication system, comprising a host and a universal serial bus (USB) device;

wherein the USB device comprises a first memory storing programming instructions; and a first processor configured to be capable of executing the stored programming instructions to perform steps comprising:

after the USB is inserted into a host, configuring single disk device information and information of at least one work mode, and sending the single disk device information to the host, wherein the single disk device information comprises installation information as per which the host installs a function management module;

receiving a configuration instruction issued by the function management module of the host; and selecting information of a work mode according to the configuration instruction and configuring the work mode as a current valid work mode;

wherein the host, comprising a second memory storing programming instructions; and a second processor configured to be capable of executing the stored programming instructions to perform steps comprising:

installing, the function management module according to installation information in the single disk device information, and then generating and issuing, by the function management module, a configuration instruction to the USB device;

wherein the generating a configuration instruction by the function management module comprises:

issuing, by the host, an information request instruction to the USB device;

sending, by the USB device, work mode information to the host; and generating, by the function management module, the configuration instruction according to the work mode information sent by the USB device.

7. The communication system according to claim 6, wherein the first processor configured to be capable of executing the stored programming instructions to perform steps comprising:

sending work mode information to the host according to an information request instruction issued by the host, receiving the configuration instruction issued by the host based on the work mode information and select information of the work mode and configuring the work mode as the current valid work mode.

8. The communication system according to claim 6, wherein the first processor configured to be capable of executing the stored programming instructions to perform steps comprising:

receiving an information report instruction issued by the host and reporting current work mode information to the host according to the information report instruction.

9. The communication system according to claim 8, wherein the first processor configured to be capable of executing the stored programming instructions to perform steps comprising:

initializing an application layer module to place the application layer module in a ready state after the USB device is inserted into the host and the host is powered on.

10. The method for work mode switching of a USB device according to claim 2, after selecting information of a work mode and configuring the work mode as the current valid work mode, the method further comprising:

receiving, by the USB, an information report instruction issued by the host and reporting current work mode information to the host according to the information report instruction.

11. The method for work mode switching of a USB device according to claim 10, after inserting the USB device into the host, the method further comprising:

initializing an application layer module to place the application layer module in a ready state.

12. The communication system according to claim 7, wherein the first processor configured to be capable of executing the stored programming instructions to perform steps comprising:

receiving an information report instruction issued by the host and report current work mode information to the host according to the information report instruction.

13. The communication system according to claim 12, wherein the first processor configured to be capable of executing the stored programming instructions to perform steps comprising:

initializing an application layer module to place the application layer module in a ready state after the USB device is inserted into the host and the host is powered on.

* * * * *